United States Patent [19]

Hashimoto

[11] 4,294,889
[45] Oct. 13, 1981

[54] RESIN COMPOSITIONS AND HEAT-SEALABLE COMPOSITE BIAXIALLY-STRETCHED FILMS

[75] Inventor: Fukashi Hashimoto, Yokkaichi, Japan

[73] Assignee: Mitsubishi Petrochemical Co., Ltd., Tokyo, Japan

[21] Appl. No.: 24,673

[22] Filed: Mar. 28, 1979

[51] Int. Cl.³ ............................................. B32B 27/08
[52] U.S. Cl. ................................... 428/515; 428/516; 428/517; 428/519; 428/521; 428/910
[58] Field of Search ............... 428/515, 516, 517, 519, 428/521, 910; 260/897 A

[56] References Cited

U.S. PATENT DOCUMENTS 4,117,193  9/1978  Tsuchiya ............................. 428/910

Primary Examiner—Marion McCamish

Attorney, Agent, or Firm—Robert E. Burns; Emmanuel J. Lobato; Bruce L. Adams

[57] ABSTRACT

A biaxially-stretched polypropylene composite film comprises a biaxially-stretched substrate film of a crystalline polypropylene and a monoaxially- or biaxially-stretched film of a resin composition bonded in laminated state to at least one surface of the substrate film, the resin composition comprising 96 to 50 percent (by weight) of a propylene copolymer (a), 3 to 30 percent of a polybutene-1 (b), and 1 to 20 percent of an ethylene-propylene-butene-1 random copolymer (c). The propylene copolymer (a) is an ethylene-propylene random copolymer ($a_1$), an ethylene-propylene-butene-1 random copolymer ($a_2$), or a mixture ($a_3$) of at least two kinds of copolymers each of at least two monomers selected from ethylene, propylene, and butene-1. The resin composition comprising the components (a), (b) and (c) is also provided and is characterized by its capability of being heat sealed at low temperatures.

9 Claims, 4 Drawing Figures

RESIN COMPOSITIONS AND HEAT-SEALABLE COMPOSITE BIAXIALLY-STRETCHED FILMS

BACKGROUND OF THE INVENTION

1. Field of the Art

This invention relates generally to resin compositions and heat-sealable biaxially-stretched composite films having improved heat sealing and other characteristics.

More specifically, the invention relates to resin compositions of specific compositions each formed by blending an olefin-butene-1 copolymer of a specific composition and a crystalline polybutene-1 with a propylene copolymer of specific composition and relates also to biaxially-stretched polypropylene films onto at least one surface of each of which a resin composition of this character is laminated. Thanks to the low-temperature heat-sealing characteristics of the resin compositions, a composite biaxially-stretched polypropylene film is useful particularly for overwrap packaging.

Biaxially-stretched polypropylene films to which heat sealability has been imparted are endowed with the transparency, rigidity, strength, moisture-proof property, and other favorable properties possessed by biaxially-stretched polypropylene and are being widely used in the packaging field.

Among biaxially-stretched polypropylene films to which heat sealability has been imparted by various techniques, particularly those to whose both surfaces low-temperature heat sealability has been imparted are being used in the field of overwrap packaging. A film for overwrap packaging is used for the overwrapping of commodities which are principally packaged in paper boxes, such as tobacco and cigarettes, pharmaceutical products, soaps, and caramels.

Since overwrap packaging, in general, is carried out at a rate of 200 to 400 packages per minute by means of high-speed automatic packaging machines, a degree of suitability for automatic packaging is required of the wrapping material. More specifically, the prime requirement in automatic overwrap packaging is low-temperature heat sealability of the wrapping material. Since the weight of one packaging unit or piece of a commodity to be packaged as mentioned above, in general, is less than 100 grams (g.), the heat seal strength is not required to be very high, but it is necessary that a heat seal have a heat seal strength higher than 200 g./2 cm. of width even in the vicinity of 100° C.

The next most important requirements in automatic overwrap packaging are that the wrapping film material possess rigidity, strength, good slip characteristic, and antistatic property so that the film will not bend or fold or break during its feeding since the film is fed at high speed into the packaging machine. Particularly when the slip characteristic and the antistatic property are deficient, automatic high-speed packaging with the film material in a packaging machine cannot be carried out. In addition to the above described suitability for automatic packaging, a film for overwrap packaging is required to have transparency for imparting an aesthetically pleasing appearance to the packaged commodity and, further, to have moistureproof property for protecting the commodity.

2. Prior Art

One of the known methods for imparting low-temperature heat sealability to a biaxially-stretched polypropylene film for the use of this film in overwrap packaging is the so-called coating method in which a biaxially-stretched polypropylene film which has once been processed and formed is coated with an agent for imparting heat sealability. For this agent for imparting heat sealability, solutions in organic solvents such as toluene, ethyl acetate, and methyl ethyl ketones of chlorinated polypropylene, polyvinylidene chloride, or the like as the predominant ingredient or coatings such as vinylidene chloride/acrylonitrile copolymer emulsions for application on an undercoat of an isocyanate adhesive solution can be used.

However, while the coating method can impart low-temperature heat sealability, the heat sealability imparting agent is applied as a coating in a process step separate from the process of producing the biaxially-stretched polypropylene film or a process step of drying off the organic solvent with hot air after the coating step. These additional steps not only add complications to the production process but also increase the production cost. Furthermore, since the heat sealability imparting agent is applied as a coating, not only is the transparency, which is an original advantageous feature of a biaxially stretched polypropylene film, impaired, but in the case where an organic solvent used, the organic solvent unavoidably remains in the coating layer, which is not a desirable state from the point of view of hygiene.

In order to avoid the above described high cost, residual solvent, and other problems of the coating method, there has been proposed a method wherein, in the production of a biaxially-stretched polypropylene film, a resin composition of a melting point lower than that of the base or substrate polypropylene is laminated to the polypropylene for imparting low-temperature heat sealability thereto, and then the laminated film is biaxially stretched. This lamination method is an excellent method since it has a higher productivity and simpler process steps than the coating method.

For the resin composition for imparting low-temperature heat sealability used in this method, ethylene resins and propylene resins have been proposed.

As ethylene resins, low-density polyethylenes and medium-density polyethylenes (as described in Japanese Patent Laid Open No. 101420/1974), ethylene-vinyl acetate copolymers (Japanese Patent Publication No. 11353/1966) and others have been proposed. In the case of an ethylene resin, however, while it is able to impart low-temperature heat sealability in correspondence with its low melting point, it is inferior to propylene resins in properties such as rigidity, transparency, hot slipping characteristic, and scratch resistance. Consequently, in the present state of the art, a composite, biaxially-stretched polypropylene film with a laminated layer of an ethylene resin which is amply satisfactory as a film for overwrap packaging has yet to appear.

On the other hand, propylene resins such as ethylene-propylene copolymers (as described in Japanese Patent Publication No. 31478/1971), propylene-butene-1-copolymers (as described in Japanese Patent Laid Open No. 128781/1975) and ethylene-propylene-butene-1 copolymers (as described in Japanese Patent Laid Open No. 35487/1974) have been proposed. In the case of propylene resins, however, while they are satisfactory on the points of rigidity, transparency, hot slipping characteristic, and scratch resistance, their low-temperature heat sealability is inferior because their melting points are higher in comparison with ethylene resins. Consequently, a composite, biaxially-stretched polypropylene film with a laminated layer of a propylene resin which is fully satisfactory as a film for overwrap packaging, also, has not yet been produced.

With the intent of improving the low-temperature heat sealability, which is a problem accompanying propylene resins to be used as agents for imparting heat sealability, compositions formed by blending propylene resins and polybutene-1 have been proposed as resin compositions for imparting low-temperature heat sealability. As one example, in Japanese Patent Laid Open No. 114482/1976, a method wherein by blending at least 5 percent by weight of a polybutene-1 with an olefin polymer and further adding a specific bisamide, the deterioration of transparency and the deterioration of heat sealability due to variation in the crystalline structure of the polybutene-1 are suppressed is described. As another example, Japanese Patent Laid Open No. 150560/1976 discloses an agent for imparting low-temperature heat sealability which is formed by blending 35 to 65 percent by weight of a polybutene-1 with a propylene-butene-1 random copolymer of a butene-1 content of 10 to 15 percent by weight. As still another example, Japanese Patent Laid Open No. 150561/1976 proposed an agent for imparting low-temperature heat sealability which is formed by blending 45 to 65 percent by weight of a polybutene-1 with an ethylene-propylene random copolymer of an ethylene content of 0.5 to 4.5 percent by weight.

However, to the best of my knowledge, it is difficult to say that these proposals are fully satisfactory. More specifically, in the method of the above cited Japanese Patent Laid Open No. 114482/1976, a specific bisamide must be added. In the case of the Japanese Patent Laid Open Nos. 150560/1976 and 150561/1976, the imparting of low-temperature heat sealability becomes possible only by blending a large quantity of at least 35 percent by weight of the polybutene-1, but the blending of such a large quantity of the polybutene-1 causes an impairment of the transparency and luster, which are characteristics originally possessed by a biaxially-oriented polypropylene film.

As indicated above, in the present stage of the art, a resin composition for imparting low-temperature heat sealability and a biaxially-stretched polypropylene film onto which this composition has been laminated as a layer, which are fully satisfactory for overwrap packaging, and in which the various desirable characteristics originally possessed by biaxially-stretched polypropylene films are not impaired, have not yet been produced.

In view of this state of the art, I have previously proposed the utilization of blended compositions of olefinbutene-1 copolymers of specific compositions and polybutene-1 as resins of low-temperature heat sealability (as disclosed in the specification of Japanese Patent Application No. 93907/1977).

SUMMARY OF THE INVENTION

It is an object of this invention to solve the above described problems encountered in the prior art. It is contemplated in this invention to achieve this object by utilizing, as the resin having low-temperature heat sealability, a blended composition of a propylene copolymer of specific composition and an olefin-butene-1 copolymer of a specific composition.

According to this invention in one aspect thereof, briefly summarized, there is provided a resin composition comprising:

from 96 to 50 percent of a propylene copolymer (a), which is a member selected from the group consisting of (a$_1$) ethylene-propylene random copolymers each of an ethylene component content of 1.5 to 10 percent, (a$_2$) ethylene-propylene-butene-1 random copolymers each of an ethylene component content of 0 to 5 percent, a butene-1 component content of 8 to 30 percent, and a propylene component content of 92 to 65 percent, and (a$_3$) mixtures each of at least two kinds of copolymers each of at least two monomers out of ethylene, propylene, and butene-1 respectively corresponding to an ethylene component content of 0 to 5 percent, a propylene component content of 98.5 to 65 percent, and a butene-1 component content of 0 to 30 percent;

from 3 to 30 percent of a polybutene-1 (b); and from 1 to 20 percent of an ethylene-propylene-butene-1 random copolymer (c) of a propylene component content of 0.5 to 3 percent and a butene-1 component content of 2 to 10 percent, of a density of 0.915 to 0.935 g./cm.$^3$ and of a melting point of 115° to 125° C., all quantities expressed in percent being by weight.

According to this invention in another aspect thereof there is provided a biaxially-stretched polypropylene composite film comprising a biaxially-stretched film of crystalline polypropylene and a monoaxially-stretched or biaxially-stretched film of a resin composition bonded in laminated state to at least one surface of the crystalline polypropylene film, the resin composition being that defined in the preceding paragraph.

The nature, utility, and further features of this invention will be more clearly apparent from the following detailed description, beginning with a consideration of general aspects of the invention and concluding with specific examples of practice constituting preferred embodiments of the invention and comparison examples.

Figure 1:
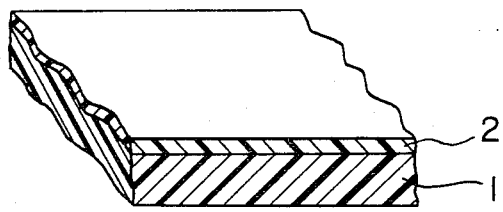
FIGS. 1 and 2 are enlarged, fragmentary perspective views, partly in section, respectively showing examples of composite, biaxially-stretched polypropylene composite films in sheet form according to this invention with the resin composition according to the invention laminated onto one surface and both surfaces of a substrate film.

The resin compositions in accordance with the present invention have a low content of polybutene-1 which is up to 30 percent by weight, and provide biaxially-stretched polypropylene films with heat sealability at low temperatures required for the films as overwrap materials. The resin compositions comprising the components (a), (b) and (c) have lower sealing temperatures than the compositions comprising only the components (a) and (b).

DETAILED DESCRIPTION

1. Propylene Copolymer (a)

One of the essential components of the resin composition according to this invention is a propylene copolymer, which is a copolymer selected from random copolymers (a₁) and (a₂) and mixtures (a₃) thereof of the following composition.

| Monomer Composition | Composition (% by weight) | | |
|---|---|---|---|
| | Copolymer $a_1$ | Copolymer $a_2$ | Copolymer Mixture $a_3$ |
| ethylene | 1.5–10 | 0–5 | 0–5 |
| propylene | 98.5–90 | 92–65 | 98.5–65 |
| butene-1 | — | 8–30 | 0–30 |

In the case where the propylene copolymer is an ethylenepropylene random copolymer (a₁), the desirable contents are 2 to 10 percent of the ethylene component and 98 to 90 percent of the propylene component.

In the case where the propylene copolymer is an ethylene-propylene-butene-1 random copolymer (a₂-1), the desirable content ranges are 0.5 to 5 percent of the ethylene component, 98.5 to 70 percent of the propylene component, and 1 to 25 percent of the butene-1 component. Particularly desirable ranges are 0.5 to 3 percent of the ethylene component, 91.5 to 85 percent of the propylene component, and 8 to 15 percent of the butene-1 component.

In the case where the propylene copolymer is a propylene-butene-1 random copolymer (a₂-2), the desirable contents are 8 to 30 percent of the butene-1 component and 92 to 70 percent of the propylene component. Particularly desirable is 8 to 25 percent of the butene-1 component.

Another kind of the propylene copolymer in this invention is a mixture (a₃) of at least two copolymers each of at least two of ethylene, propylene, and butene-1. In the copolymers in this case are included the above mentioned copolymers (a₁) and (a₂-1 and a₂-2). The contents of the copolymers constituting the mixture, when this mixture is considered as a copolymer, are 0 to 5 percent of the ethylene component, 98.5 to 65 percent of the propylene component, and 0 to 30 percent of the butene-1 component.

It is to be understood that, in addition to copolymers comprising only ethylene, propylene, and/or butene-1 copolymers of two or three of these essential monomers and further comonomer(s), such as pentene-1, for example, of a quantity less than that of the component of the smallest content of the essential monomers falls within the scope of the term "propylene copolymer (a)" used herewithin.

A suitable value of the melt flow rate (MFR) of a propylene copolymer (a) of this character is of the order of 1 to 30 g./10 min. It is necessary to determine the specific value of this MFR in correlation with those of the polybutene-1 (b) and the ethylene copolymer (c) to be combined with this propylene copolymer (a), as described in detail hereinafter.

The propylene copolymers a₁ and a₂ can be prepared by the processes set forth, for example, respectively in Japanese Patent Publication No. 27419/1968 for a₁ and Patent Publication No. 35487/1974 for a₂.

2. Polybutene-1 (b)

Another essential component of the resin composition according to this invention is a crystalline polybutene-1. While a crystalline homopolybutene-1 is one representative example, it may be copolymer of butene-1 with a small quantity of a comonomer (e.g., ethylene, propylene, or pentene-1) provided that it can be said to be a crystalline polybutene-1.

A suitable value of the MFR of a polybutene-1 is at least 1 g./10 min. A value of the order of 5 to 50 g./10 min. is particularly desirable. It is necessary to determine the specific value of this MFR in correlation with that of the propylene copolymer to be combined with the polybutene-1, as described in detail hereinafter.

A polybutene-1 can be prepared by the process described, for example, in Japanese Patent Publication No. 14541/1974, and, by regulating the polymerization conditions such as the quantity of hydrogen added, the polymerization temperature, and the catalyst quantity, a polybutene-1 which is particularly effective for the practice of this invention can be obtained. In the case where the polybutene-1 obtained in this manner, or a given polybutene-1, does not have the desired MFR value, the MFR value can be adjusted by a technique such as degradation of polymer molecules cutting or fractionation.

3. Ethylene Copolymer

One other essential component of the resin composition according to this invention is an ethylene copolymer of a melting point of 115° to 125° C. and a density of 0.915 to 0.935 g./cm³. This copolymer, in general, has the following composition.

| Monomer Component | Compositional Content (% by weight) |
|---|---|
| ethylene | 98 to 87 |
| propylene | 0.5 to 3 |
| butene-1 | 2 to 10 |

The composition of this ethylene copolymer is preferably 94.5 to 90 percent of the ethylene component, 0.5 to 2.5 percent of the propylene component, and 3 to 7 percent of the butene-1 component.

If the ethylene-propylene-butene-1 copolymer has a composition according to the above stated ranges, the use by blending at least two of the various copolymers of ethylene, propylene, and butene-1 will not lead to any impairment whatsoever of the effectiveness of this invention. Furthermore, an ethylene-propylene-butene-1 copolymer in which a comonomer of a quantity less than a component of lowest content of these monomers such as, for example, pentene-1, is further copolymerized is also within the purview of this invention.

A suitable ethylene-propylene-butene-1 copolymer of this character is one having an MFR value of at least 1 (g./10 min.), preferably of the order of 2 to 50 (g./10 min.). In actual practice, it is necessary that the specific MFR value be selected in correlation with the propylene copolymer to be combined with this olefin-butene-1 copolymer, as described in detail hereinafter.

The ethylene-propylene-butene-1 copolymer can be prepared by the process disclosed in Japanese Patent Publication No. 35344/1974 and Patent Laid Open No. 82385/1976.

4. Resin Composition

Each of the resin compositions according to this invention contains the above described propylene copolymer (a), crystalline polybutene-1 (b), and ethylene copolymer (c) as essential components. Specific selection of these essential components is carried out with consideration of the MFR values and the ratio of quantities of the resins.

More specifically, in the first place, the MFR values of the polybutene-1 (b) snd the ethylene copolymer (c) are desirably equal to or greater than the MFR value of the propylene copolymer (a) at the same temperature within the range of 180° to 300° C. If the MFR values of the copolymers (b) and (c) are less than that of the copolymer (a) (which is, when the copolymer (a) is a mixture of copolymers, the MFR value of the copolymer predominating in the mixture), surface roughness of the product film will occur, and the transparency and the low-temperature heat sealability will deteriorate. In this connection, the MFR values set forth herein are values as measured in accordance with condition E of ASTM designation D 1238-1973 and under the conditions of 190° C./2.16 kg. load/10 min. time.

One more important factor regulating the nature of the resin composition according to this invention is the quantitative proportions. These proportions are within the limits of 96 to 50 percent of the propylene copolymer (a), 3 to 30 percent of the polybutene-1 (b), and 1 to 20 percent of the ethylene copolymer (c); preferably 92 to 65 percent of the propylene copolymer (a), 3 to 20 percent of the polybutene-1 (b), and 3 to 15 percent of the ethylene copolymer (c), all percentages being based on the total quantity of the three components. If the proportions of the polybutene-1 (b) and the ethylene copolymer (c) are less than 3 percent and 1 percent, respectively, a sufficiently low-temperature heat sealability cannot be realized. On the other hand, if these proportions exceed 30 percent and 20 percent, respectively, surface roughness of the film will arise, whereby the transparency will deteriorate, and, at the same time, the low-temperature heat sealability will be impaired.

These resins can be rendered into the resin composition of this invention by any process wherein uniform mutual dispersion of the three components is possible. For example, the three resin components in powder form and in the prescribed proportions can be dry blended in a device such as a super-mixer with or without further melt kneading. Alternatively, the components can be directly melt kneaded without dry blending. Still another process comprises blending and/or kneading one or two of the three resins, for example, the polybutene-1 in a quantity greater than the prescribed proportion to form master pellets and then diluting these master pellets with the remaining resin or resins to prepare the prescribed resin composition.

The resin composition according to this invention can contain, in addition to the above described three indispensable components, various auxiliary ingredients ordinarily blended with resin composition, such as an antioxidant or oxygen inhibitor, an anti-blocking agent, a slip agent, an antistatic agent, and a colorant or coloring agent. Furthermore, the resin composition can contain also a small quantity of a kneadable or compatible resin.

5. Composition Biaxially-stretched Polypropylene Film

Figure 2:
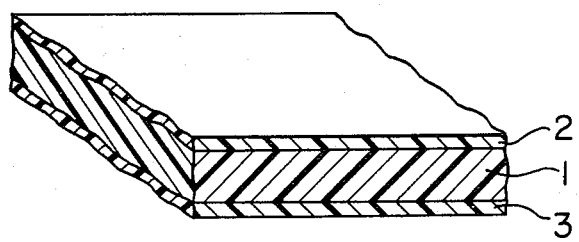
Figure 3:
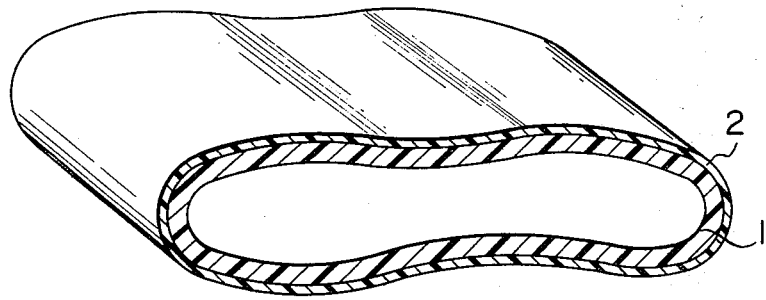
FIGS. 3 and 4 are views similar to FIGS. 1 and 2, respectively showing examples of the films in tubular form according to the invention with the resin composition according to the invention laminated onto one surface and both surfaces of a substrate film.
Figure 4:
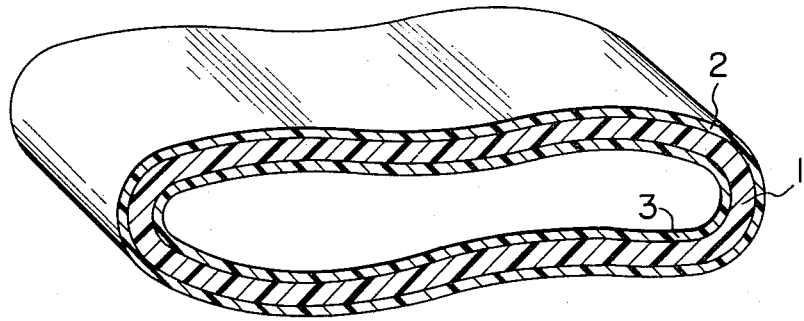

The composite biaxially-stretched polypropylene film according to this invention is a laminated structure comprising a biaxially-stretched polypropylene film and a layer of the above described resin composition bonded laminately on one surface or on each of the two surfaces of the polypropylene film constituting a substrate. Examples of these composite films are illustrated in the accompanying drawing, in which the film thickness is greatly magnified. FIG. 1 shows a film in sheet form comprising a substrate film 1 and a resin composition 2 bonded onto one surface thereof, while FIG. 2 shows another film in sheet form comprising a substrate film 1 and films 2 and 3 of the resin composition bonded onto the two surfaces thereof. FIGS. 3 and 4 respectively show similar structures in the case where the composite film is of tubular form.

While one representative example of the polypropylene to stand as the substrate is crystalline homopolypropylene, the polypropylene may be a copolymer of propylene with a small quantity of another comonomer such as, for example, another olefin, provided that a biaxial stretching effect can be realized or provided that the resin can be said to be crystalline. It is preferable that a biaxially-stretched film of a crystalline polypropylene of this character be stretched in each axial direction with a stretch ratio of 3 or more (with an upper limit of the order of 12).

The layer of the resin composition of this invention bonded onto at least one surface of this biaxially-stretched polypropylene film may be a layer which is unstretched or a layer which has been monoaxially or biaxially stretched. This layer of resin for imparting low-temperature heat sealability is ordinarily laminated with the polypropylene substrate by co-extrusion with the polypropylene layer, or by melt extrusion of the resin on an unstretched or mono-axially-oriented polypropylene sheet, to form a laminated structure, which is then stretched so that the polypropylene film is rendered into a biaxially-stretched state, as is described in detail hereinafter. Accordingly, this layer of the resin composition is ordinarily monoaxially or biaxially stretched. Actually, the resin composition laminated with the polypropylene film should be in a melted or a half-melted state at the time of the final-stage stretching, considering the melting point thereof, and it probably has substantially no orientation.

While there is no limit to the total thickness of the composite biaxially-stretched polypropylene film of this invention, in general, a desirable thickness is from 10 microns to 100 microns, preferably from 15 microns to 50 microns. A desirable thickness of the substrate biaxially-stretched polypropylene film is of the order of 13 to 45 microns.

The thickness of the laminated layer of the resin composition comprising the propylene copolymer (a), the polybutene-1 (b), and the ethylene copolymer (c) constituting the resin composition for imparting low-temperature heat sealability is desirably 0.2 micron to 10 microns, preferably 0.5 to 5 microns, on each of the sides of the composite biaxially-stretched polypropylene film. If the thickness of the laminated layer of the resin composition is less than 0.2 micron, not only will an ample heat seal strength be unattainable, but the layer will be unable to impart low-temperature heat sealability. If the thickness of the laminated layer of the resin composition exceeds 10 percent of the total film thickness, the layer will be able to impart heat seal strength and low-temperature heat sealability, but rigidity and strength, which are advantageous characteristics of a biaxially-stretched polypropylene, will be lost.

In the case of lamination on both surfaces of the substrate, the thicknesses of the two laminated layers of the resin composition for imparting low-temperature heat sealability may or may not be different, and their compositions may or may not be different from each other.

6. Production of the Composite Biaxially-stretched Polypropylene Film.

One example of the process of producing a composite biaxially-stretched polypropylene film to which low-temperature heat sealability has been imparted according to this invention will now be described.

One laminating method comprises melt extruding into a sheet a two-layer of resin composition/polypropylene combination or a three-layer of resin composition/polypropylene/resin combination so that the resin composition will be in a laminated state on one or both surfaces of the substrate polypropylene in sheet form, the resin composition being for imparting low-temperature heat sealability and comprising the propylene copolymer (a), the polybutene-1 (b), and the ethylene copolymer (c). This lamination method is desirable for reasons such as its affording easy formation of a uniform, thin laminated layer of the resin composition and elimination of the possibility of air being introduced and trapped between the layers.

However, it is also possible to produce the composite film by a method which comprises first forming the substrate polypropylene into a non-stretched sheet or a monoaxially stretched sheet in the longitudinal direction and then forming by melt extrusion, on at least one surface of this yet unstretched or stretched sheet to form a laminated layer of the resin composition.

The longitudinal stretching or drawing is carried out by subjecting the above described two-layer or three-layer sheet obtained by extrusion lamination to stretching by the process known in the art wherein a difference between the peripheral speeds of rolls is utilized. The sheet is stretched in the longitudinal direction with a stretch ratio of 3 to 8, preferably 4 to 6, at a temperature of 90 to 140° C., preferably 105° to 135° C. The sheet is then successively stretched in the transverse direction with a stretch ratio of 3 to 12, preferably 6 to 11 in, for example, a conventional tenter oven. It is desirable to heat set this film at a temperature of 120° to 170° C. after the transverse stretching in order to prevent heat shrinkage at the time of heat sealing.

Following the heat setting step, corona discharge treatment may be carried out on the film for the purpose of improving its properties such as printability and acceleration of bleeding of the antistatic agent.

Furthermore, a tubular structure having a laminated construction as described above may be subjected to a biaxial stretching process. The stretch ratio in this case is of the order of 4 to 7, preferably 5 to 6, in each of the longitudinal and transverse directions.

7. Examples of Experiments

Throughout the following examples and comparison examples, quantities expressed in percent (%) are by weight unless specifically designated otherwise. The values of heat seal strength, haze, MFR, melting point, and scratch resistance were measured under the following respective conditions.

1. Heat seal strength

A heat-sealed sample was prepared by heat sealing films at various set temperatures by means of a 5 mm.×200 mm. heat-sealing bar under the heat-sealing conditions of a heat-sealing pressure of 1 kg./cm.$^2$ and a heat-sealing time of 0.5 sec. From this sample, test specimens of 20-mm. width were cut out, and the T-peel strengths thereof were measured by means of an Instron testing machine at a tensile force application speed of 500 mm./min.

2. Haze

Haze was measured in accordance with ASTM D 1003-61 by means of a haze-meter manufactured by the Toyo Seiki Seisaku-sho, Japan.

3. MFR

MFR values were measured according to condition E of ASTM D 1238-1973.

4. Melting point (Tm)

The peak value of the melting curve obtained with a sample quantity of 5.0 mg. and a temperature rise rate of 10° C./min. by means of a DSC manufactured by the Perkin-Elmer Company. Temperature correction was made with the use of In, Bi, Sn, Pb, and Ga according to the method disclosed in references such as "Netsu Sokutei" (heat Measurement) Vol. 3, No. 83 (1976). The melting point of polybutene-1 is a melting point of Form II, and polybutene-1 changes to Form I (melting point approximates 130° C.) at room temperature in approximately one week (J. Polymer Sci., A-1 59 (1963)).

5. Scratch resistance 50 g. of sand of a particle size of 40 to 50 mesh was dropped onto the film surface (at an angle of 45 degrees) from a height of 1.5 meters (m.), and the difference between the hazes before and after this treatment was indicated.

EXAMPLE 1

Polypropylene (MFR of 1 g./10 min., isotactic index (I.I) of 98%, and Tm of 165° C.) was used for the substrate layer. For the low-temperature heat sealable resin, a blended composition was prepared by dry blending for 2 minutes in a super-mixer 80 percent of an ethylene-propylene random copolymer (MFR of 2.6 g./10 min., ethylene content of 4.2 percent, Tm of 139° C.) (a), 10 percent of a polybutene-1 (MFR of 18 g./10 min. and Tm of 111° C.) (b), and 10 percent of an ethylene copolymer (ethylene-propylene-butene-1 copolymer of a $C_2$ content of 92.9 percent, $C_3$ content of 1.6 percent, $C_4$ content of 5.5 percent, density of 0.922 g./cm.$^3$, Tm of 119° C., and MFR of 3.2 g./10 min.) (c). During this blending, masterbatch pellets of an antiblocking agent and a slip agent were added. The resin composition thus obtained was laminated on the substrate and thereafter biaxially stretched in the following manner thereby to produce a composite, biaxially-stretched polypropylene film.

The polypropylene and the resin composition were melt coextruded through a two-resin, three-layer T-die at 240° C. respectively by means of 65-mm. diameter and 35-mm. diameter extruders to form a three-layer structure of a resin composition/polypropylene/resin composition arrangement. This structure was solidified on metal rolls of 250-mm. diameter at a surface temperature of 30° C. into a sheet. This sheet was preheated and then stretched with a stretch ratio of 5 in the longitudinal direction at 115° C. by utilizing the difference between the peripheral speeds of rolls. The sheet was then drawn with a draw ratio of 10 in the transverse direction in a tenter oven at 165° C. and was thereafter heat set at 160° C. The film thus obtained was subjected to corona discharge treatment on the process line thereby to accelerate the bleeding of the additives.

The thickness constitution of the composite, biaxially-stretched polypropylene film thus obtained was: resin composition/polypropylene/resin composition = 1/18/1 (micron).

Comparison Examples 1 through 4

For the purpose of comparison with Example 1, resin compositions (Comparison Example 3) were formed by blending in various proportions the ethylene copolymer (c) of Example 1 respectively with an ethylene-propylene random copolymer (MFR of 2.6/10 min., Tm of 139° C., and $C_2$ content of 4.2%) (a) (Comparison Example 1), an ethylene copolymer (MFR of 3.2 g./10 min. Tm of 117° C., and density of 0.922 g./cm.$^3$) (c)

(Comparison Example 2), and an ethylene-propylene random copolymer (MFR of 2.6 g./10 min., Tm of 139° C., and ethylene content of 4.2%) (a), and resin compositions (Comparison Example 4) were formed by blending in various proportions a polybutene-1 (MFR of 18 g./10 min. and Tm of 111° C.) with an ethylene-propylene random copolymer (MFR of 2.6 g./10 min., Tm of 139° C., and ethylene content of 4.2%) (a).

By the procedure set forth in Example 1, these resin compositions were coextruded as heat sealable resins with the polypropylene thereby to produce composite, biaxially-stretched polypropylene films. In these films also, the laminated layer resins contained an anti-blocking agent and a slip agent in the same quantities as set forth in Example 1. Measured results of the heat seal strengths, hazes, and scratch resistances of these films are shown in Tables 1 and 2.

As the apparent from Tables 1 and 2, the film of Example 1 has a low-temperature heat sealability which is much superior to that of the film of Comparison Example 1. As is apparent from the results of Comparison Examples 3 and 4, if polybutene-1, which is one component of the composition of this invention, or any other component such as the ethylene copolymer is omitted, a limit is imposed on the improvement of the low-temperature heat sealability, which therefore cannot equal that in Example 1. Furthermore, in Comparison Example 2, the low-temperature heat sealability is excellent, but the scratch resistance is poor.

TABLE 1

|  | Haze | Scratch Resistance | Heat Seal Strength (g./2 cm.) | | | | | | | |
|---|---|---|---|---|---|---|---|---|---|---|
|  |  |  | 95° C. | 100° C. | 105°C. | 110° C. | 115° C. | 120° C. | 125° C. | 130° C. |
| Example 1 | 0.8 | 5.0 | 0 | 20 | 80 | 135 | 240 | 325 | 460 | 450 |
| Comparison Example 1 | 0.7 | 5.2 |  |  |  |  |  | 0 | 135 | 410 |
| Comparison Example 2 | 1.1 | 8.3 | 20 | 70 | 210 | 360 | 400 | 430 | — | — |

TABLE 2

|  | PB* Content (%) | EC* Content (%) | Heat Seal Strength (g./2 cm.) | | | | | | | |
|---|---|---|---|---|---|---|---|---|---|---|
|  |  |  | 95° C. | 100° C. | 105° C. | 110° C. | 115° C. | 120° C. | 125° C. | 130° C. |
| Comparison Example 3-1 | 0 | 2.5 |  |  |  |  |  | 0 | 170 | 455 |
| Comparison Example 3-2 | 0 | 5 |  |  |  |  |  | 0 | 260 | 470 |
| Comparison Example 3-3 | 0 | 10 |  |  |  |  |  | 0 | 330 | 485 |
| Comparison Example 3-4 | 0 | 20 |  |  |  |  |  | 0 | 350 | 470 |
| Comparison Example 3-5 | 0 | 30 |  |  |  |  | 0 | 65 | 215 | 430 |
| Comparison Example 4-1 | 2 | 0 |  |  |  |  |  | 0 | 115 | 390 |
| Comparison Example 4-2 | 5 | 0 |  |  |  |  | 0 | 105 | 360 | 395 |
| Comparison Example 4-3 | 10 | 0 |  |  |  | 0 | 20 | 100 | 220 | 375 | 500 |
| Comparison Example 4-4 | 20 | 0 |  |  |  | 0 | 20 | 100 | 250 | 350 | 400 |
| Comparison Example 4-5 | 30 | 0 |  |  |  | 0 | 20 | 50 | 230 | 330 | 470 |
| Comparison Example 4-6 | 40 | 0 |  |  |  |  |  | 0 | 50 | 380 | 450 |

*PB Polybutene-1
*EC Ethylene copolymer

EXAMPLE 2 AND COMPARISON EXAMPLE 5

Composite, biaxially-stretched polypropylene films were produced by using the same resins and the same procedure as in Example 1 with various different blend proportions of the low-temperature heat sealable resin composition. The results are set forth in Table 3. In this case also, similarly as in Example 1, an anti-blocking agent and a slip agent were added in specific quantities to each resin composition.

TABLE 3

|  | PB Content (%) | EC Content (%) | Haze | Heat Seal Strength (g./2 cm.) | | | | | | |
|---|---|---|---|---|---|---|---|---|---|---|
|  |  |  |  | 100° C. | 105° C. | 110° C. | 115° C. | 120° C. | 125° C. | 130° C. |
| Comparison Example 5-1 | 1 | 1 | 1.3 |  |  |  |  | 0 | 130 | 415 |
| Comparison Example 5-2 | 1 | 5 | 1.3 |  |  |  |  | 0 | 250 | 460 |
| Comparison Example 5-3 | 2.5 | 2.5 | 1.4 |  |  |  |  | 0 | 335 | 470 |
| Comparison Example 5-4 | 2.5 | 30 | 11.8 |  |  |  |  | 0 | 415 | 435 |
| Example 2-1 | 5 | 3 | 1.4 |  |  |  | 0 | 70 | 380 | 460 |
| Example 2-2 | 5 | 20 | 4.6 |  |  | 0 | 65 | 225 | 460 | 455 |
| Example 2-3 | 10 | 2.5 | 1.4 | 0 | 40 | 150 | 290 | 370 | 380 | — |

TABLE 3-continued

| | PB Content (%) | EC Content (%) | Haze | Heat Seal Strength (g./2 cm.) | | | | | | |
|---|---|---|---|---|---|---|---|---|---|---|
| | | | | 100° C. | 105° C. | 110° C. | 115° C. | 120° C. | 125° C. | 130° C. |
| Example 2-4 | 10 | 10 | 1.7 | 20 | 80 | 135 | 240 | 325 | 460 | — |
| Comparison Example 5-5 | 10 | 30 | 13.1 | | | 0 | 60 | 135 | 350 | 460 |
| Example 2-5 | 20 | 2.5 | 1.6 | 0 | 20 | 105 | 290 | 370 | 360 | — |
| Example 2-6 | 20 | 20 | 4.5 | | 0 | 30 | 230 | 415 | 450 | — |
| Example 2-7 | 30 | 2.5 | 1.9 | 0 | 20 | 65 | 260 | 290 | 460 | — |
| Comparison Example 5-6 | 50 | 20 | 7.8 | | | 0 | 20 | 370 | 440 | 510 |

EXAMPLE 3 AND COMPARISON EXAMPLE 6

Composite, biaxially-stretched polypropylene films were produced with constant blend proportions of the low-temperature heat sealable resin composition (80 percent of the ethylene-propylene random copolymer (a), 10 percent of the polybutene-1 (b), and 10 percent of the ethylene copolymer (c)) but with respectively different relationships between magnitudes of the values of MFR of the ethylene-propylene random copolymer and the polybutene-1 and the ethylene copolymer. The procedure of Example 1 was followed.

The results are shown in Table 4.

TABLE 4

| | MFR* of EP | MFR of PB | MFR of EC | Haze | Heat Seal Strength (g./2 cm.) | | | | |
|---|---|---|---|---|---|---|---|---|---|
| | | | | | 90° C. | 100° C. | 110° C. | 120° C. | 130° C. |
| Example 1 | 2.6 | 18 | 3.2 | 0.8 | 0 | 20 | 135 | 325 | 450 |
| Example 3-1 | 2.6 | 5.2 | 3.2 | 0.9 | 0 | 25 | 130 | 295 | 460 |
| Comparison Example 6-1 | 2.6 | 2.2 | 3.2 | 2.5 | 0 | 0 | 60 | 250 | 470 |
| Comparison Example 6-2 | 2.6 | 5.2 | 2.2 | 3.7 | 0 | 0 | 35 | 220 | 400 |
| Example 3-2 | 11 | 18 | 14 | 0.8 | 0 | 35 | 160 | 310 | 395 |
| Comparison Example 6-3 | 11 | 5.2 | 14 | 2.4 | 0 | 0 | 50 | 280 | 420 |
| Comparison Example 6-4 | 11 | 5.2 | 3.2 | 4.1 | 0 | 0 | 20 | 50 | 390 |

*EP Ethylene-propylene random copolymer

The properties of the polymers used were as follows:
(1) Ethylene-propylene random copolymer
MFR=2.6 g./10 min., $C_2$=4.2%, Tm=139° C.
MFR=11 g./10 min., $C_2$=3.9%, Tm=140° C.
(2) Ethylene copolymer
MFR=3.2, 2.2, and 14 g./10 min.
Density=0.919 to 0.923 g./cm.$^3$
Tm=118° to 120° C.
Ethylene content=92.9 to 94.3%
Propylene content=1.6 to 1.9%
Butene-1 content=4.0 to 5.5%

EXAMPLE 4

A resin composition was prepared as a low-temperature heat sealable resin by dry blending for 2 minutes in a super-mixer: 80 percent of an ethylene-propylene-butene-1 random copolymer (of an MFR of 3.0 g./10 min., an ethylene content of 1.3%, a propylene content of 85.7%, a butene-1 content of 13%, and a Tm of 132° C.) (a) to which an anti-blocking agent and a slip agent had been added; 10 percent of a polybutene-1 (of a MFR of 18 g./10 min. and a Tm of 111° C.; and 10 percent of an ethylene copolymer which is an ethylene-propylene-butene-1 copolymer (of a $C_2$ content of 92.9%, a $C_3$ content of 1.6%, a $C_4$ content of 5.5%, an MFR of 3.2 g./10 min., a specific gravity of 0.922, and a Tm of 119° C.) (c).

The blended resin composition thus prepared was then laminated onto a substrate layer of a polypropylene (of an MFR of 1 g./10 min., I.I. of 98%, and a Tm of 165° C.) by the process described below, and then this laminated sheet was biaxially stretched thereby to produce a composite, biaxially-stretched polypropylene film.

The polypropylene and the blended resin composition were melt coextruded at 240° C. through a two-resin, three layer T-die respectively from 115-mm. diameter and 35-mm. diameter extruders thereby to produce a three-layer resin composition/polypropylene/resin composition structure. This three-layer structure was solidified on group of metal rolls of 215-mm. diameter at a surface temperature of 30° C. into a sheet form. This sheet was thereafter preheated and then stretched in the longitudinal direction at 115° C. with a stretch ratio of 5 by utilizing difference in peripheral speeds of rolls.

Following the longitudinal stretching step, the sheet was stretched in the transverse direction with a stretch ratio of 10 in a tenter oven at 165° C. and heat set at 160° C. and thereafter was subjected to corona discharge treatment in order to accelerate the bleeding of the additives. The thickness constitution of the composite, biaxially-stretched polypropylene film thus obtained was: resin composition/polypropylene/resin composition=1/18/1 (micron).

The heat seal strengths in the following examples and comparison examples are those of untreated surfaces.

COMPARISON EXAMPLES 7, 8, AND 9

For the purpose of comparison with Example 4, the following heat sealable resins were prepared respectively for Comparison Examples 7, 8, and 9. For Comparison Example 7, an ethylene-propylene-butene-1 random copolymer (of an MFR of 3.0 g./10 min., a $C_2$ content of 1.3%, a $C_3$ content of 85.7%, a $C_4$ content of 13%, and a Tm of 132° C.) (a) to which an anti-blocking agent and a slip agent had been added was used. For Comparison Example 8, a blended resin composition formed by blending 10 percent of a polybutene-1 (of an MFR of 18 g./10 min. and a Tm of 111° C.) (c) to 90 percent of an ethylene-propylene-butene-1 random copolymer (of an MFR of 3.0 g./10 min., a $C_2$ content of 1.3%, a $C_3$ content of 85.7%, a $C_4$ content of 14%, and a Tm of 132° C.), to which resin composition an anti-blocking agent and a slip agent had been added, was used. For Comparison Example 9, a resin composition formed by blending 10 percent of an ethylene copolymer (of a $C_2$ content of 92.9%, a $C_3$ content of 1.6%, a $C_4$ content of 5.5%, an MFR of 3.2 g./10 min., a density of 0.922 g./cm.$^3$, and a Tm of 119° C.) (c) with 90 percent of an ethylene-propylene-butene-1 random copolymer (of an MFR of 3.0 g./10 min., a $C_2$ content of 1.3%, a $C_3$ content of 85.7%, a $C_4$ content of 14%, and a Tm of 132° C.) (a) and further blending therewith an anti-blocking agent and a slip agent was used.

These resin compositions were respectively coextruded and drawn with the polypropylene by the procedure set forth in Example 4 thereby to produce respective composite, biaxially-stretched polypropylene films. Measured results of heat seal strength and haze of these films are shown in Table 5.

1.1%, a $C_3$ content of 83.9%, a $C_4$ content of 15%, and a Tm of 131° C.; and a copolymer of an MFR of 6.3 g./10 min., a $C_2$ content of 1.3%, a $C_3$ content of 85.7%, a $C_4$ content of 13%, and a Tm of 132° C. Furthermore, the ethylene copolymers (c) are of MFR values of 3.2, 2.2, and 14 g./10 min., densities of 0.919 to 0.923 g./cm.$^3$, melting points of 118 to 120° C., ethylene contents of 92.9 to 94.3%, propylene contents of 1.6 to 1.7%, and butene-1 contents of 4.0 to 5.5 percent.

EXAMPLE 8

As a low-temperature heat sealable resin, a resin composition was prepared by blending the same polybutene-1 (b) and ethylene copolymer (c) as in Example 4, each in a quantity of 10 percent to 80 percent of a propylene-butene-1 random copolymer (of an MFR of 2.7 g./10 min., a $C_4$ content of 23%, and a Tm of 133° C.) and adding thereto an anti-blocking agent and a slip agent. By using this resin, composite, biaxially-stretched polypropylene films were produced. The results thereof are shown in Tables 6 and 7.

COMPARISON EXAMPLE 12

For the purpose of comparison with Example 8, a

TABLE 5

| | PB Content (%) | EC Content (%) | Haze | Heat Seal Strength (g./2 cm.) | | | | | | |
|---|---|---|---|---|---|---|---|---|---|---|
| | | | | 95° C. | 100° C. | 105° C. | 110° C. | 115° C. | 120° C. | 125° C. |
| Example 4 | 10 | 10 | 1.7 | 0 | 65 | 240 | 370 | 450 | 460 | |
| Comparison Example 7 | 0 | 0 | 1.4 | | | | 0 | 150 | 440 | |
| Comparison Example 8 | 10 | 0 | 1.5 | 0 | 10 | 190 | 375 | 390 | 450 | |
| Comparison Example 9 | 0 | 10 | 1.7 | | | 0 | 10 | 50 | 200 | |

EXAMPLE 5 AND COMPARISON EXAMPLE 10

The procedure set forth in Example 4 was carried out with the same resins and the same additive concentrations and blends with different quantity ratios of the resin composition. The results are set forth in Table 6.

EXAMPLE 6 AND COMPARISON EXAMPLE 11

Composite, biaxially-stretched polypropylene films were produced according to the procedure described in Example 4 with constant blend quantity ratio of the low-temperature heat sealable resin composition and constant contents of the anti-blocking agent and the slip agent (80 percent of the ethylene-propylene-butene-1 random copolymer (a), 10 percent of the polybutene-1 (b), and 10 percent of the ethylene copolymer (c)) and with varied relationships of magnitudes of the MFR values of the propylene copolymer (a), the polybutene-1 (b), and the ethylene copolymer (c). The results are shown in Table 7.

The ethylene-propylene-butene-1 copolymer (a) used in this case are, in addition to the resin of Example 4, a copolymer of an MFR of 2.7 g./10 min., a $C_2$ content of low-temperature heat sealable resin was prepared by blending 10 percent of the polybutene-1 (b), an anti-blocking agent, and a slip agent with 10 percent of the propylene-butene-1 random copolymer (a) specified in Example 8. This blended composition was used to produce a composite, biaxially-stretched polypropylene film by the procedure set forth in Example 4. The results of measurement of haze and heat seal strength of this film are shown in Table 6.

COMPARISON EXAMPLE 13

For the purpose of comparison with Example 9, a composite, biaxially-stretched polypropylene film was produced by the procedure of Example 4 without changing the blend quantity ratio and the blending quantities and kinds of the anti-blocking agent and the slip agent but varying the MFR values of the polybutene-1 (b) and the ethylene copolymer (c). The results are shown in Table 7.

The polybutene-1 (b) and the ethylene copolymer (c) used in the instant example were the same as those used in Comparison Example 11-1.

TABLE 6

| | PB Content (%) | EC Content (%) | Haze | Heat Seal Strength (g./2 cm.) | | | | | |
|---|---|---|---|---|---|---|---|---|---|
| | | | | 95° C. | 100° C. | 105° C. | 110° C. | 115° C. | 120° C. |
| Comparison Example 7 | 0 | 0 | 1.4 | | | | 0 | 150 | 440 |
| Comparison Example 10-1 | 5 | 0 | 1.5 | | 0 | 60 | 220 | 310 | 440 |
| Comparison Example 10-2 | 35 | 0 | 1.8 | | 0 | 135 | 400 | 420 | |

TABLE 6-continued

| | PB Content (%) | EC Content (%) | Haze | Heat Seal Strength (g./2 cm.) | | | | | |
|---|---|---|---|---|---|---|---|---|---|
| | | | | 95° C. | 100° C. | 105° C. | 110° C. | 115° C. | 120° C. |
| Comparison Example 10-3 | 2.5 | 2.5 | 1.5 | | | 0 | 200 | 410 | 435 |
| Comparison Example 10-4 | 2.5 | 30 | 9.7 | | | 0 | 70 | 280 | 360 |
| Comparison Example 10-5 | 35 | 2.5 | 1.9 | | | 0 | 100 | 350 | 420 |
| Comparison Example 10-6 | 35 | 30 | 13.6 | | | | 0 | 200 | 310 |
| Example 5-1 | 5 | 5 | 1.4 | 0 | 45 | 145 | 290 | 325 | — |
| Example 5-2 | 5 | 20 | 3.3 | 0 | 15 | 100 | 275 | 470 | — |
| Example 5-3 | 20 | 5 | 1.8 | 0 | 20 | 110 | 410 | 430 | — |
| Example 5-4 | 30 | 10 | 2.1 | 0 | 0 | 90 | 260 | 360 | 420 |
| Example 4 | 10 | 10 | 1.7 | 0 | 65 | 240 | 370 | 450 | 460 |
| Comparison Example 8 | 10 | 0 | 1.5 | 0 | 10 | 190 | 375 | 330 | 450 |
| Example 8 | 10 | 10 | 1.3 | 0 | 110 | 270 | 395 | 420 | 430 |
| Comparison Example 12 | 10 | 0 | 1.2 | | 0 | 120 | 225 | | |

TABLE 7

| | MFR | | | Haze | Heat Seal Strength (g./2 cm.) | | | | | |
|---|---|---|---|---|---|---|---|---|---|---|
| | EP | PB | EC | | 95° C. | 100° C. | 105° C. | 110° C. | 115° C. | 120° C. |
| Example 4 | 3.0 | 18 | 3.2 | 1.4 | 0 | 65 | 240 | 370 | 450 | 460 |
| Example 6-1 | 3.0 | 5.2 | 3.2 | 1.4 | 0 | 50 | 225 | 380 | 430 | 420 |
| Comparison Example 11-1 | 3.0 | 2.2 | 3.2 | 3.1 | | 0 | 95 | 185 | 320 | 440 |
| Comparison Example 11-2 | 3.0 | 5.2 | 2.2 | 4.6 | | | 0 | 200 | 295 | 410 |
| Example 6-2 | 6.3 | 18 | 14 | 1.2 | 0 | 80 | 230 | 380 | 450 | 450 |
| Comparison Example 11-3 | 6.3 | 5.2 | 14 | 3.0 | | 0 | 90 | 200 | 310 | 400 |
| Comparison Example 11-4 | 6.3 | 5.2 | 2.2 | 6.2 | | | 0 | 55 | 305 | 400 |
| Example 8 | 2.7 | 18 | 3.2 | 1.5 | 0 | 110 | 270 | 395 | 420 | 430 |
| Comparison Example 13 | 2.7 | 2.2 | 3.2 | 3.3 | | 0 | 220 | 365 | 400 | 450 |

What I claim is:

1. A biaxially-stretched polypropylene composite film comprising a biaxially-stretched film of a crystalline polypropylene and a monoaxially-stretched or biaxially-stretched film of a resin composition bonded in laminated state to at least one surface of the crystalline polypropylene film, the resin composition comprising:
  from 96 to 50 percent of a propylene copolymer (a), which is a member selected from the group consisting of
   (a$_1$) ethylene-propylene random copolymers each of an ethylene component content of 1.5 to 10 percent,
   (a$_2$) ethylene-propylene-butene-1 random copolymers each of an ethylene component content of 0 to 5 percent, a butene-1 component content of 8 to 30 percent, and a propylene component content of 92 to 65 percent, and
  from 3 to 30 percent of a polybutene-1- (b); and
  from 1 to 20 percent of an ethylene-propylene-butene-1 random random copolymer (c) of a propylene component content of 0.5 to 3 percent and a butene-1-component content of 2 to 10 percent, of a density of 0.915 to 0.935 g./cm.$^3$, and of a melting point of 115° to 125° C.,
all quantities expressed in percent being by weight, and in which the melt flow rate of said propylene copolymer (a) is about 1 to 30 g./10 min., the melt flow rate of said polybutene-1 (b) is about 5 to 50 g./10 min. and the melt flow rate of said ethylene-propylene-butene-1 copolymer (c) is about 2 to 50 g./10 min., with the proviso that at 180°–300° C. the melt flow rate of propylene copolymer (a) is equal to or less than those of polybutene-1 (b) and ethylene copolymer (c).

2. A biaxially-stretched polypropylene film according to claim 1 in which said propylene copolymer (a) is composed of ethylene-propylene random copolymer having an ethylene component content of 2 to 10%.

3. A biaxially-stretched polypropylene film according to claim 1 in which said propylene copolymer (a) is composed of ethylene-propylene-butene-1 random copolymer having an ethylene component content of 0.5 to 3%, a propylene component content of 91.5 to 83% and a butene-1 component content of 8 to 15%.

4. A biaxially-stretched polypropylene film according to claim 1 in which said propylene copolymer (a) is composed of propylene-butene-1 random copolymer having a butene-1 component content of 8 to 25%.

5. A biaxially-stretched film according to claim 1 in which said ethylene-propylene-butene-1 random copolymer (c) has an ethylene component content of 94.5 to 90%, a propylene content of 0.5 to 2.5% and a butene-1 component content of 3 to 7%.

6. A biaxially-stretched film according to claim 1 in which said film of resin is a biaxially stretched film laminated to each side of said crystalline polypropylene film in a thickness of about 0.2 to 10 microns.

7. A biaxially-stretched film according to claim 1 in which said resin composition comprises 92 to 65% of said propylene copolymer (a), 3 to 20% of said polybutene-1(b) and 3 to 15% of said ethylene copolymer(c).

8. A biaxially-stretched polypropylene composite film according to claim 1 in which said biaxially-stretched polypropylene composite film is stretched in the longitudinal direction with a stretch ratio of about 3 to 8 at a temperature of about 90° to 140° C. and in the transverse direction with a stretch ratio of about 3 to 12.

9. A biaxially-stretched polypropylene composite film according to claim 1 in which said biaxially stretched polypropylene composite film is stretched in the longitudinal direction with a stretch ratio of about 4 to 6 at a temperature of about 105° to 135° C. and in the transverse direction with a stretch ratio of about 6 to 11.

* * * * *